United States Patent [19]

Mautner

[11] 4,061,809

[45] Dec. 6, 1977

[54] DECORATIVE PANEL OF WOOD STRIPS HAVING SECTIONS OF VARYING THICKNESS

[76] Inventor: Edward J. Mautner, 7937 West Drive, Miami Beach, Fla. 33141

[21] Appl. No.: 767,909

[22] Filed: Feb. 11, 1977

[51] Int. Cl.² .......................... B32B 3/14; B32B 3/16
[52] U.S. Cl. ................................. 428/50; 428/172; 428/191; 428/213
[58] Field of Search .................. 428/50, 45, 48, 49, 428/51, 53, 56, 60, 172, 191

[56] References Cited

U.S. PATENT DOCUMENTS

| 2,514,318 | 7/1950 | Elmendorf | 20/89 |
| 3,761,336 | 9/1973 | Quinif | 428/50 |
| 3,988,187 | 10/1976 | Witt | 428/50 |

Primary Examiner—Marion E. McCamish

[57] ABSTRACT

A decorative panel composed of a backing board having a front main surface to which there are adhered a plurality of strips of different thickness and of varying lengths but all of a common width with the same being arranged in a common orientation in rows in abutting relation of the rows and the strips in each row so as to completely cover the surface of the backing board and define a pattern in relief of strips of wooden material creating a highly decorative panel.

2 Claims, 3 Drawing Figures

DECORATIVE PANEL OF WOOD STRIPS HAVING SECTIONS OF VARYING THICKNESS

FIELD OF THE INVENTION

This invention relates to wall covering materials, generally.

BACKGROUND OF THE INVENTION

In the past, there have been numerous types of paneling or wall covering material. This is of a panel which is adapted to be used as a wall cover and which is highly decorative and may be composed of relatively inexpensive but highly decorative pieces of wood arranged in a pattern. More specifically, it is an object of this invention to provide a panel composed of a backing board to which there are adhered in columns strips of wood of varying lengths but of a common width and which rows are all of a common length and are arranged in side-by-side relation to define a decorative pattern in relief of wood strips which are adhered to a backing panel creating a highly decorative wall covering.

In accordance with these and other objects which will become apparent hereinafter, the instant invention will now be described with reference to the accompanying drawings in which:

DESCRIPTION OF PREFERRED EMBODIMENT

Figure 1:
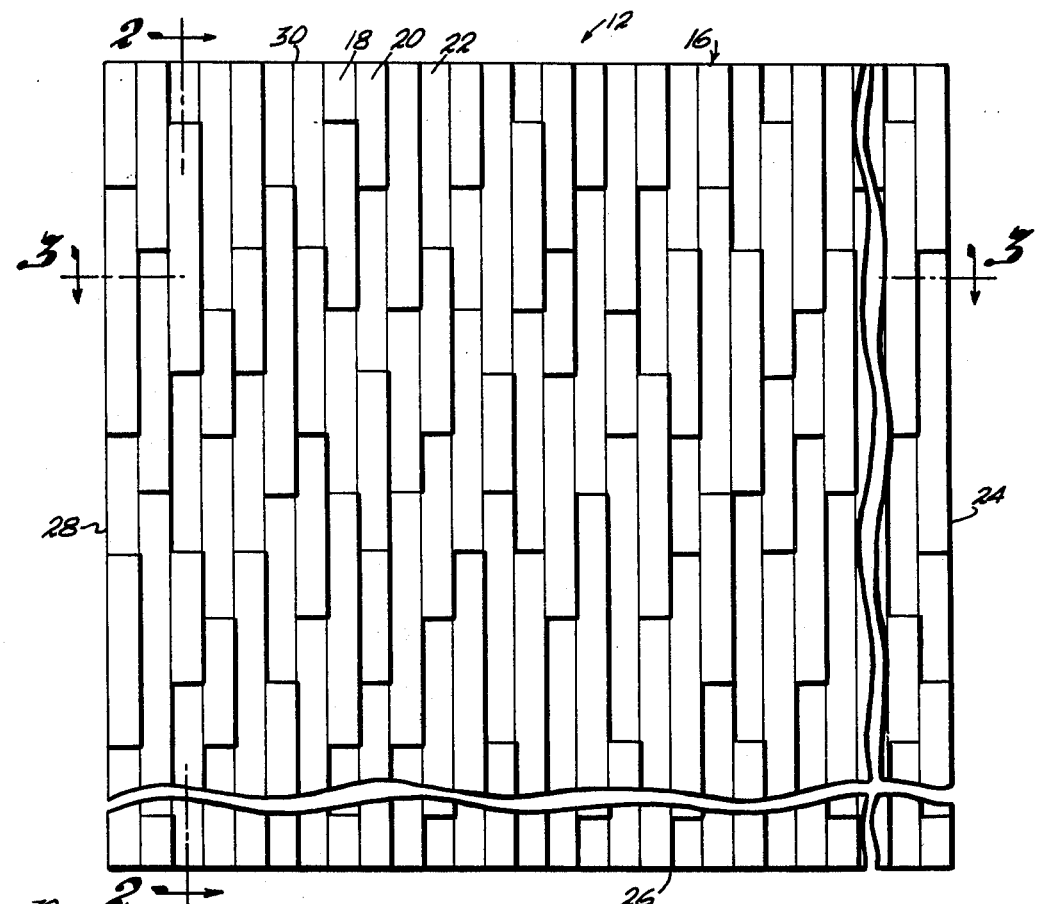
FIG. 1 is a plan view of a panel constructed in accordance with this invention.

A decorative panel, especially adapted for use as a panel-type covering will now be described. Generally, the same is composed of a panel-type structure 12 which includes a backing board 14 having an outer main surface, generally designated by the numeral 16 and a pair of opposed side edges 24 and 28 and an upper and lower edge 30 and 26. The main surface is composed of a plurality of strips such as that designated by the numerals 18, 20 and 22 which are adhered by suitable means to the surface of the backing board 14, so as to completely overlay the backing board. Preferably, each of the strips are of a different length and of a different thickness, see FIG. 3. In this manner what might be considered as waste strips or small pieces of wood are utilized to form a pattern in relief on a backing board which creates a highly decorative pattern. In a preferred embodiment, the panel is provided with a mating pair, that is, a second panel which includes a pattern in relief which for purposes of describing the same, may be considered as a mirror image of the panel as seen in cross section, see FIG. 3. That is to say, that the high and low areas of the first pair receive the low and high areas, in abutting relation, of the second pair, so that the two panels may be placed together in a planar package for shipment without damage.

Figure 3:
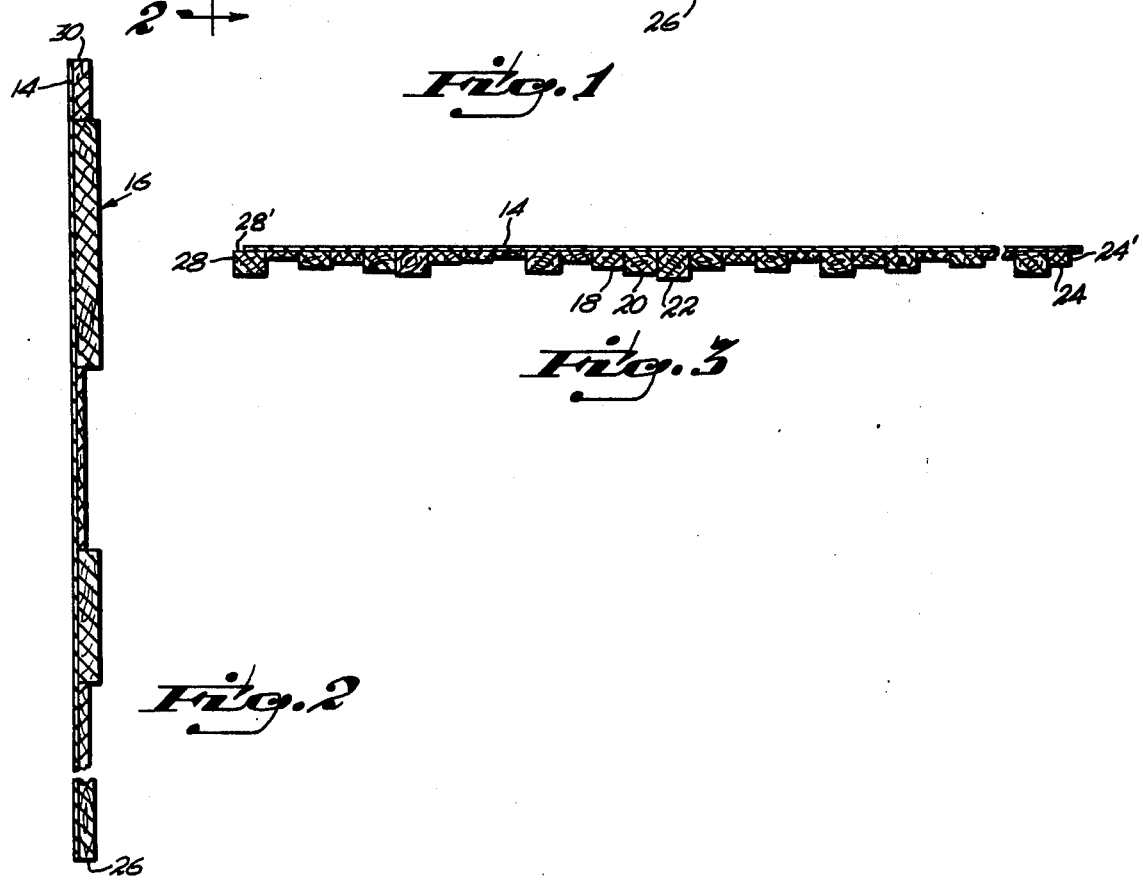
FIG. 3 is a view in cross section taken on the plane indicated by the line 3—3 of FIG. 1 and looking in the direction of the arrows.
Figure 2:
FIG. 2 is a view in cross section taken on the plane indicated by the line 2—2 of FIG. 1 and looking in the direction of the arrows.

In the preferred embodiment the strips of wood in the row along the edge 28 extends outwardly slightly over the backing board defining a lip of the strip 28 as at 28' and the strip designated by the numeral 24 is cut away slightly along the edge as indicated in FIG. 3 at 24' so that the adjacent edges of panels may be positioned one over the other for mating relation in covering a wall.

What is claimed is:

1. A decorative panel comprising a backing board and a plurality of equiwidth rows of wood strips of a common length equal to the length of the backing board and of a number such so as to completely cover the panel and wherein the rows comprise a plurality of strips in abutting relation to one another with adjacent strips being of a different thickness.

2. The device as set forth in claim 1 wherein the strips are each of a common wood.

* * * * *